US009899866B2

(12) United States Patent
Verma

(10) Patent No.: US 9,899,866 B2
(45) Date of Patent: Feb. 20, 2018

(54) REGULATOR RECTIFIER DEVICE AND A METHOD FOR REGULATING AN OUTPUT VOLTAGE OF THE SAME

(71) Applicant: Flash Electronics (India) Private Limited, Chakan Pune (IN)

(72) Inventor: Ramit Verma, Chakan Pune (IN)

(73) Assignee: FLASH ELECTRONICS (INDIA) PRIVATE LIMITED, Chakan Pune (IN)

( * ) Notice: Subject to any disclaimer, the term of this patent is extended or adjusted under 35 U.S.C. 154(b) by 0 days.

(21) Appl. No.: 15/533,898

(22) PCT Filed: Oct. 27, 2015

(86) PCT No.: PCT/IN2015/050147
§ 371 (c)(1),
(2) Date: Jun. 7, 2017

(87) PCT Pub. No.: WO2016/092565
PCT Pub. Date: Jun. 16, 2016

(65) Prior Publication Data
US 2017/0366036 A1 Dec. 21, 2017

(30) Foreign Application Priority Data
Dec. 11, 2014 (IN) .......................... 3957/MUM/2014

(51) Int. Cl.
*H02J 7/14* (2006.01)
*H02J 7/06* (2006.01)
(Continued)

(52) U.S. Cl.
CPC ............... *H02J 7/06* (2013.01); *H02J 7/022* (2013.01); *H02J 7/1492* (2013.01);
(Continued)

(58) Field of Classification Search
CPC ...... H02J 7/022; H02J 7/06; H02J 7/14; H02J 7/1492; H02J 2007/10; H02M 1/084; H02M 7/162; H02M 7/2173; Y02T 10/92
See application file for complete search history.

(56) References Cited

U.S. PATENT DOCUMENTS 7,729,145 B2 * 6/2010 Takashima ................ H02J 7/04
363/128
2011/0241611 A1 10/2011 Watanabe et al.
(Continued)

FOREIGN PATENT DOCUMENTS

WO WO-2013014115 A1 1/2013
WO WO-2013150692 A1 10/2013

*Primary Examiner* — Patrick O'Neill
(74) *Attorney, Agent, or Firm* — Harness, Dickey & Pierce, P.L.C.

(57) ABSTRACT

A regulator rectifier device and a method for regulating an output voltage of the same which takes input from three phase alternating current voltage generating device with each phase including a positive cycle and a negative cycle. A first rectifying unit with a first gate terminal, connected to the generating device to rectify the positive cycle of said three phase alternating current voltage. A second rectifying unit with a second gate terminal, connected to said generating device to rectify the negative cycle of said three phase alternating current voltage, wherein said second rectifying unit switches between rectification mode and shunt mode depending on the load condition. And a controlling unit configured to control said second rectifying unit by a gate control signal, said controlling unit outputs said gate control signal based on an output voltage of said regulator rectifier device with respect to a first predefined voltage in battery connected condition or third predefined voltage in battery-less condition and said positive cycle and said negative cycle of each phase of said three phase alternating current voltage from said generating device, said gate control signal enables (Continued)

said second rectifying unit to switch between rectification mode and shunt mode by controlling the second gate terminal of said second rectifying unit, wherein said gate control signal switches said second rectifying unit into shunt mode when the output voltage of said regulator rectifier device is greater than said first predefined voltage in battery connected condition or third predefined voltage in batteryless condition and thereby continuing the shunting of said second rectifying unit as long as said positive cycle of corresponding phase of said three phase alternating current voltage exists.

29 Claims, 10 Drawing Sheets

(51) Int. Cl.
*H02M 7/217* (2006.01)
*H02J 7/02* (2016.01)
*H02M 1/084* (2006.01)
*H02J 7/10* (2006.01)

(52) U.S. Cl.
CPC ......... *H02M 1/084* (2013.01); *H02M 7/2173* (2013.01); *H02J 2007/10* (2013.01); *Y02T 10/92* (2013.01)

(56) References Cited

U.S. PATENT DOCUMENTS

| | | |
|---|---|---|
| 2012/0074897 A1 | 3/2012 | Daigo |
| 2013/0049705 A1 | 2/2013 | Kawamura et al. |
| 2013/0113283 A1 | 5/2013 | Shiek |
| 2014/0139195 A1* | 5/2014 | Bellomini ............. H02J 7/1492 322/28 |
| 2016/0144732 A1* | 5/2016 | Ramraika ........... B60L 11/1811 320/109 |

* cited by examiner

126

REGULATOR RECTIFIER DEVICE AND A METHOD FOR REGULATING AN OUTPUT VOLTAGE OF THE SAME

CROSS-REFERENCE TO RELATED APPLICATIONS

This application is a 371 U.S. National Stage of International Application No. PCT/IN2015/050147, filed on Oct. 27, 2015 and claims priority to Indian Application No. 3957/MUM/2014, filed on Dec. 11, 2014. The entire disclosures of the above applications are incorporated herein by reference.

TECHNICAL FIELD

The present invention relates to a regulator rectifier device and a method for regulating an output voltage of the same. More particularly the present invention relates to a MOSFET based automotive regulating and rectifying devices to be used effectively for battery charging and for powering various electrical or electronic devices such as ECU, lighting Lamp load, various sensors, Solenoids or fuel injectors or the likes.

BACKGROUND

Rectification of voltages from Alternating Current voltage to Direct Current voltage is very common since past many years. Diodes are the most common part, which is used for rectification of the AC voltage either in half wave mode or full wave mode. For Automotive Battery charging or powering some battery operated loads, there is a need to regulate the Direct Current voltage to a particular limit, which is known as regulation. For regulation, the controlling of the rectification using thyristors either series type or shunt type configuration are required. Shunt type regulators are more common in high power applications. However SCR based shunt type regulators are inefficient due to high drop in thyristors.

New trends in automotive regulator rectifier or battery charger are based on MOSFETs. These MOSFET based regulator rectifier or battery charger are much more efficient than SCR type. However, the efficient controlling of the RR i.e. regulator rectifier become a major concern in terms of voltage stability and thermal efficiency.

Similarly, prior art document US 2011/0241611 discloses a battery charger and a method to control the efficiency no matter how the power consumption of the battery or load is changed. The document discloses a timer based method of controlling the MOSFETs basically to bypass the unbalance phase voltage due to occurrence of transients between rectification and shunting mode. This technique was adopted primarily to enhance the efficiency of battery charger during the short period between rectification mode and shunting mode. However the method of controlling MOSFET using timer is not efficient in providing full control technique as the control of individual phase lost during timer phase.

It would therefore be advantageous to provide an improved regulator rectifier device to overcome the above mentioned drawbacks and/or to provide various other benefits and advantages.

SUMMARY

One embodiment of the present invention discloses a regulator rectifier device, which has a source terminal to receive a three phase alternating current voltage with each phase including a positive cycle and a negative cycle from a generating device. Plurality of first rectifying unit with a first gate terminal, connected to the generating device to rectify the positive cycle of said three phase alternating current voltage. Plurality of second rectifying unit with a second gate terminal, connected to said generating device to rectify the negative cycle of said three phase alternating current voltage and to shunt the positive cycle of three phase alternating current voltage, wherein said second rectifying unit switches between rectification mode and shunt mode depending on the load condition. A controlling unit configured to control said second rectifying unit by a gate control signal, the controlling unit outputs said gate control signal based on an output voltage of said regulator rectifier device with respect to any one of a first predefined voltage in battery connected condition and a third predefined voltage in battery-less condition and said positive cycle and said negative cycle of each phase of said three phase alternating current voltage from said generating device, said gate control signal enables said second rectifying unit to switch between rectification mode and shunt mode by controlling the second gate terminal of said second rectifying unit, wherein said gate control signal switches said second rectifying unit in shunt mode when the output voltage of said regulator rectifier device is greater than any one of said first predefined voltage in battery connected condition and the third predefined voltage in battery-less condition and thereby continuing the shunting of said second rectifying unit as long as said positive cycle of corresponding phase of said three phase alternating current voltage exists.

The controlling unit includes a phase detection unit configured to detect said positive cycle and said negative cycle from each phase of said three phase alternating current voltage with respect to a second predefined voltage, wherein said phase detection unit outputs a third signal with a positive pulse and a negative pulse.

The controlling unit also includes a first voltage detection unit configured to detect said output voltage of said regulator rectifier device with respect to said first predefined voltage in battery connected condition. The controlling unit also includes a second voltage detection unit configured to detect said output voltage of said regulator rectifier device with respect to said third predefined voltage in battery-less condition.

The controlling unit includes a shunting mode control unit configured to provide a first signal based on the outputs of said phase detection unit i.e. a third signal and said first voltage detection unit with respect to first predefined voltage in battery connected condition. The shunting mode control unit is also configured to provide a first signal based on the third signal of said phase detection unit and a second voltage detection unit configured to detect said output voltage of said regulator rectifier device with respect to said third predefined voltage in battery-less condition. The controlling unit also includes a rectification mode control unit, which receives output from said phase detection unit i.e. third signal to provide a second signal.

The controlling unit includes a gate drive unit configured to release said gate control signal based on said second signal from said rectification mode control unit and said first signal from said shunting mode control unit. The second rectifying unit continues in shunt mode by said gate control signal and thereby said second rectifying unit becomes independent of said output voltage of said regulator rectifier device with respect to said first predefined voltage, as long as the positive cycle of corresponding phase of said three phase alternating current voltage exists, when the output voltage of said regulator rectifier device is greater than said first predefined voltage in battery connected condition or third predefined voltage in battery-less condition.

The gate control signal enables the second rectifying unit to switch in rectification mode when the phase detection unit detects said negative cycle of corresponding phase of said three phase alternating current voltage lower than said second predefined voltage. The second rectifying unit is connected to a peak voltage limiting unit configured to minimize the peak voltage during switching of second rectifying unit i.e. during crossing of second predefined voltage in each phase of said three phase alternating current voltage. During battery less condition the output terminal of said regulator rectifier device is connected with a second voltage detection unit, which senses the battery less condition and a capacitor to support regulated said output voltage with respect to said third predefined voltage.

The first rectifying unit and said second rectifying unit are assembled on a metal clad aluminum PCB for proper dissipation of heat. The regulator rectifier device is assembled on a metal clad aluminum PCB with a control card and a SMD connector.

The existence of a micro delay between changing of said positive pulse to negative pulse at the output of said phase detection unit i.e. the third signal with respect to each phase of said three phase alternating current voltage and changing of said second signal from low to high at the output of said rectification mode control unit, separates said second rectifying unit in shunt mode and rectification mode of said second rectifying unit.

In another preferred embodiment of the present invention, a method for regulating an output voltage of an regulator rectifier device comprising the steps of receiving a 3 phase alternating current voltage with each phase including a positive cycle and a negative cycle from a generating device, rectifying the positive cycle of said three phase alternating current voltage by a plurality of first rectifying unit with a first gate terminal, where its internal diodes naturally rectifies the negative cycle of said three phase alternating current voltage through the internal diodes of second rectifying unit naturally. To make this negative rectification more efficient second rectifying unit switches ON to bypass its internal diodes, so there is low voltage drop in second rectifying unit than in its internal diodes making the device more efficient thermally by a plurality of second rectifying unit with a second gate terminal connected to said generating device, said second rectifying unit switches between rectification mode and shunt mode depending on the load condition, controlling said second rectifying unit by a controlling unit, said controlling unit outputs a gate control signal based on an output voltage of said regulator rectifier device and said positive cycle and said negative cycle of each phase of said three phase alternating current voltage from said generating device, said gate control signal enables said second rectifying unit to switch between rectification mode and shunt mode by controlling the second gate terminal of said second rectifying unit, switches ON said second rectifying unit into shunt mode by said gate control signal when the output voltage of said regulator rectifier device is greater than any one of said first predefined voltage in battery connected condition and a third predefined voltage in battery-less condition and thereby continuing the shunting of said second rectifying unit as long as said positive cycle of corresponding phase of said three phase alternating current voltage exists. The method includes detecting said positive cycle and said negative cycle from each phase of said three phase alternating current voltage with respect to a second predefined voltage by a phase detection unit to output a third voltage with a positive pulse and a negative pulse.

The method includes detecting said output voltage of said regulator rectifier device with respect to said first predefined voltage by a first voltage detection unit in battery connected condition. The method also includes providing a first signal based on the outputs of said phase detection unit said third signal and said first voltage detection unit or a second voltage detection unit by a shunting mode control unit. The method provides also a second signal based on the output from said phase detection unit by a rectification mode control unit.

The method also provides said gate control signal based on said second signal from said rectification mode control unit and said first signal from said shunting mode control unit by a gate drive unit. The method also includes continuing of said second rectifying unit in shunt mode independent of said output voltage of said regulator rectifier device with respect to said first predefined voltage, as long as the positive pulse cycle of corresponding phase of said three phase alternating current voltage exists when the output voltage of said regulator rectifier device is greater than any one of said first predefined voltage in battery connected condition and the third predefined voltage in battery-less condition.

The method includes switching said second rectifying unit by said gate control signal into rectification mode when the phase detection unit detects said negative cycle of corresponding phase of said three phase alternating current voltage lower than said second predefined voltage. The method minimizes peak voltages during switching of second rectifying units during crossing of second predefined voltage in each phase of said three phase alternating current voltage by a peak voltage limiting unit connected to said second rectifying unit.

The method also includes regulating said output voltage during battery less condition by connecting the output terminal of said regulator rectifier device with the second voltage detection unit, which senses the battery-less condition and a capacitor to support regulated said output voltage with respect to said third predefined voltage.

The method includes assembling said first rectifying unit and said second rectifying unit on a metal clad aluminum PCB for proper dissipation of heat. And assembling said regulator rectifier device on a metal clad aluminum PCB with a control card and a SMD connector. Metal clad aluminum PCB is very rigid for handling and reliability, so by using metal clad aluminum PCB for power devices the assembly is very simple. Here both first rectifying devices and second rectifying devices are the MOSFETs and universally known that these devices are very sensitive for ESD failures. But by using of metal clad aluminum PCB it is possible to use SMD power components, it helps to reduce the manual work so the failure of power devices due to ESD reduces. Whole assembly can be automatic. By using metal clad aluminum PCB, heat is more evenly distributed in whole area of aluminum housing, and therefore it becomes advantageous for proper heat dissipation of first rectifying unit and second rectifying unit. So, there is a less thermal stress on first rectifying unit and second rectifying unit. It increases the life and reliability of our power devices. Resulting in increasing of life and durability of our regulator rectifier device. One more advantage of metal clad aluminum PCB is that the less thermal stress on power tracks even if very high current passes through it. Even if very high current passing through the both first rectifying unit and second rectifying unit, the tab temperature of power devices does not shoot up. To maintain two separate temperature zones i.e. power component zone and control circuit components zone, all control circuit components are kept on separate Control Card PCB and all power devices on separate metal clad aluminum PCB. By doing separate PCB for control circuit and power circuit, it is possible to keep away the control circuit components from power components.

The method includes rectifying each phase of said three phase alternating current voltage by said second rectifying unit in shunt mode and rectification mode separated from each other by a micro delay existing between changing of said positive pulse to said negative pulse in the third signal at the output of said phase detection unit with respect to each phase of said three phase alternating current voltage and changing of said second signal from low to high at the output of said rectification mode control unit.

Figure 1:
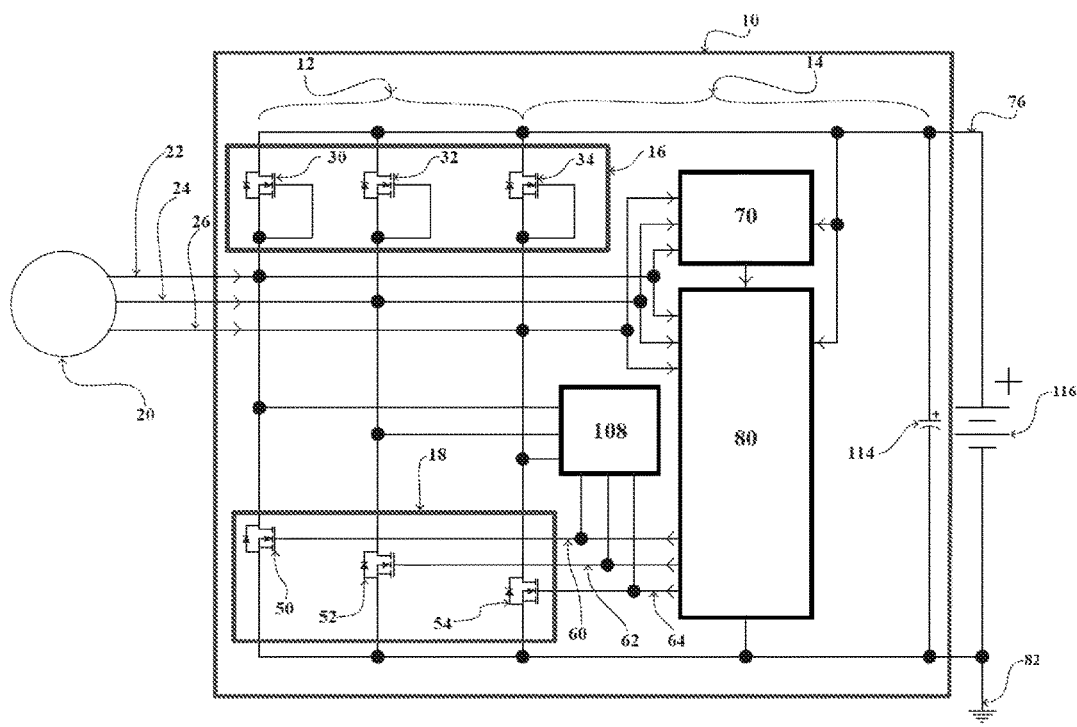
FIG. 1 illustrates an embodiment of the present invention depicting block diagram of the regulator rectifier device.

| Description of Elements | Reference Numeral |
| --- | --- |
| Regulator Rectifier device | 10 |
| Rectifying Section | 12 |
| Controlling section | 14 |
| First Rectifying Unit | 16 |
| Second Rectifying Unit | 18 |
| Generating Device | 20 |
| R Phase | 22 |
| Y Phase | 24 |
| B Phase | 26 |
| MOSFET 1 | 30 |
| MOSFET 2 | 32 |
| MOSFET 3 | 34 |
| MOSFET 4 | 50 |
| MOSFET 5 | 52 |
| MOSFET 6 | 54 |
| Gate control signal for MOSFET 4 | 60 |
| Gate control signal for MOSFET 5 | 62 |
| Gate control signal for MOSFET 6 | 64 |
| Power Supply | 70 |
| First Predefined voltage | 72 |
| Second Predefined voltage | 74 |
| Output voltage | 76 |
| Third Predefined voltage | 78 |
| Controlling Unit | 80 |
| Ground | 82 |
| Phase detection Unit | 90 |

-continued

| Description of Elements | Reference Numeral |
| --- | --- |
| Third Signal | 92 |
| Fourth Signal | 94 |
| First voltage detection Unit | 96 |
| Shunting made control unit | 98 |
| First Signal | 100 |
| Rectification mode control unit | 102 |
| Second Signal | 104 |
| Gate drive unit | 106 |
| Peak voltage limiting unit | 108 |
| Second Voltage Detection unit | 110 |
| Capacitor | 114 |
| Battery | 116 |
| Metal clad Aluminum PCB | 120 |
| Control Card | 122 |
| SMD Connector | 124 |
| Regulator Assembly | 126 |
| Aluminum Housing | 128 |
| Grommet | 130 |
| Threaded Spacer | 132 |

DETAILED DESCRIPTION OF THE INVENTION

The present invention can be fully understood by reading the following detailed description of the embodiments of a regulator rectifier device (10) and a method for regulating an output voltage (76) with respect to ground (82) of the same comprising a source terminal to receive a three phase alternating current voltage from a generating device (20), which is connected to the rectifying units in the rectifying section (12) as well as to the controlling unit (80) in the controlling section (14).

As shown in FIG. 1, the generating device (20) inputs a three phase alternating current voltage with each phase including a positive cycle and a negative cycle. The three phases includes R phase (22), Y phase (24) and B phase (26). Each of these three phases comprises a positive cycle and a negative cycle. The generating device (20) is connected to the rectifying units for both positive rectification as well as negative rectification in the rectifying section (12). The rectifying units include two sets of rectifying units i.e. first rectifying unit (16) and a second rectifying unit (18). Each of the first rectifying unit (16) has a first gate terminal and the first rectifying unit (16) comprises of three MOSFETs i.e. MOSFET 1 (30), MOSFET 2 (32) and MOSFET 3 (34). The first rectifying unit (16) is connected to the generating device (20) in a such way that the source and gate terminals of MOSFET 1 (30) is connected to R phase (22) of generating device (20), similarly the source and gate terminals of MOSFET 2 (32) is connected to Y phase (24) of generating device (20), similarly the source and gate terminals of MOSFET 3 (34) is connected to B phase (26) of generating device (20). These three MOSFETs rectify the positive cycle of each phase of the three phase alternating current voltage through its internal diodes.

The second rectifying unit (18) has a second gate terminal and the second rectifying unit (18) comprises of three MOSFETs i.e. MOSFET 4 (50), MOSFET 5 (52) and MOSFET 6 (54). The second rectifying unit (18) is connected to the generating device (20) in such a way that the drain of MOSFET 4 (50) is connected to R phase (22) of generating device (20), similarly the drain of MOSFET 5 (52) is connected to Y phase (24) of generating device (20), similarly the drain of MOSFET 6 (54) is connected to B phase (26) of generating device (20). These three MOSFETs rectify the negative cycle of each phase of the three phase alternating current voltage.

The second rectifying unit (18) i.e. MOSFET 4 (50), MOSFET 5 (52) and MOSFET 6 (54) switch between rectification mode and shunt mode depending on the load condition. These rectifying units i.e. MOSFETs as said above comprises of a source, drain and a gate terminal and also comprises an internal diode. The second gate terminal for the second rectification unit receives a gate control signal from a controlling unit (80). The controlling unit (80) is configured in a way to control the second rectifying unit (18) i.e. MOSFET 4 (50), MOSFET 5 (52) and MOSFET 6 (54) through their respective gate control signal i.e. through gate control signal for MOSFET 4 (60), gate control signal for MOSFET 5 (62) and gate control signal for MOSFET 6 (64) respectively.

The controlling unit (80) in the controlling section (14) outputs these gate control signals based on an output voltage (76) received at the output terminal of the device with respect to a first predefined voltage (72), and the positive cycle and the negative cycle of each phase of the three phase alternating current voltage. The First predefined voltage (72) is the same voltage at which regulator rectifier device (10) regulates. Further, output voltage goes above or below determines the mode of regulation, i.e. when it goes high or above then device goes in shunting mode and when it goes low or below then device goes in rectification mode.

The gate control signal enables these MOSFETs of the second rectifying unit (18) to switch between rectification mode and shunt mode by controlling the second gate terminal of their respective MOSFETs. The gate control signal controlling each gate of the MOSFETs in second rectifying unit (18) triggers the second gate terminal of their respective MOSFETs i.e. MOSFET 4 (50), MOSFET 5 (52) and MOSFET 6 (54) to switch into the shunt mode only when the output voltage (76) becomes greater than first predefined voltage (72). The shunt mode of the second rectifying unit (18) i.e. MOSFET 4 (50), MOSFET 5 (52) and MOSFET 6 (54) once switched, continues as long as the third signal (92) during positive cycle of the corresponding phase of the three phase alternating current voltage exists. Third Signal (92) for each phase is the output of a phase detection unit (90) of the respective phase of the three phase alternating current voltage.

Figure 2:
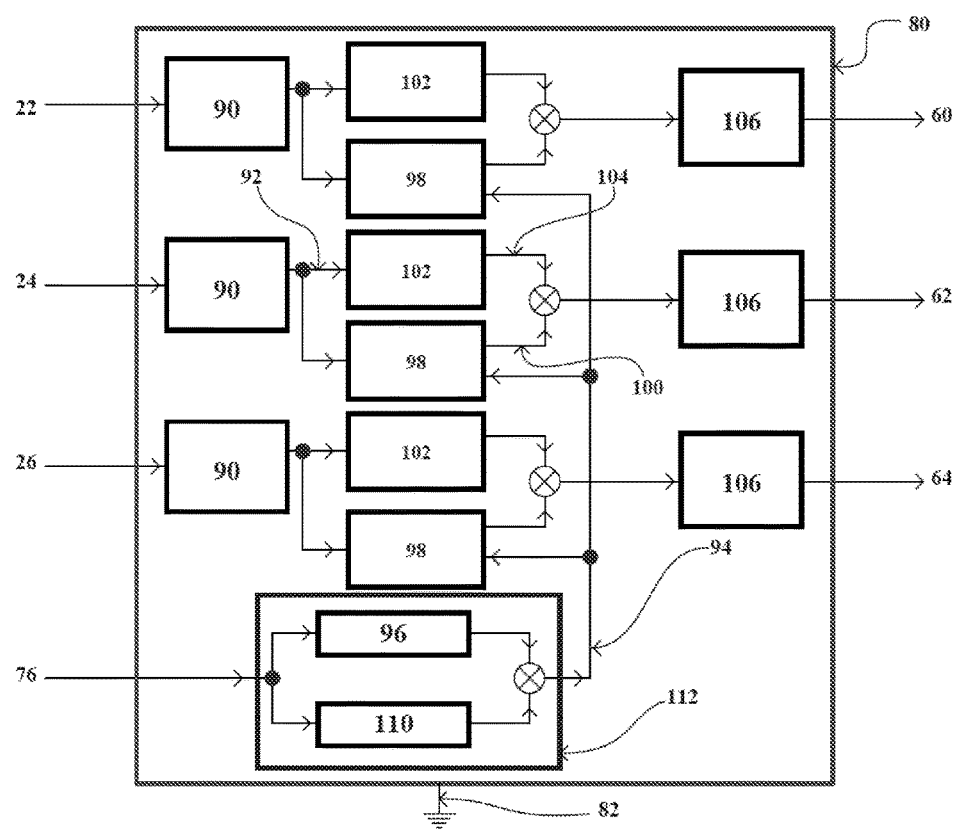
FIG. 2 illustrates an embodiment of the present invention depicting block diagram of the controlling unit.

As shown in FIG. 2, the controlling unit (80) includes a phase detection unit (90). The phase detection unit (90) is configured to detect the positive cycle and the negative cycle in each phase of the three phase alternating current voltage. The phase detection unit (90) compares the input voltages i.e. alternating current voltages from each phase with respect to a second predefined voltage (74). The second predefined voltage (74) is limited to the drop of the second rectifying unit's internal diodes i.e. MOSFET 4 (50), MOSFET 5 (52) and MOSFET 6 (54). The phase detection unit (90) compares the voltage from the phase with respect to the second predefined voltage (74) and outputs third signal (92) for respective phases. If the voltage across the phase is above the second predefined voltage (74), then the phase detection unit (90) outputs third signal (92) as a high signal or positive pulse. Whereas if the phase inputs a voltage below the second predefined voltage (74), then the phase detection unit (90) outputs a third signal (92) as a low signal or a negative pulse.

The controlling unit (80) also includes a first voltage detection unit (96) and a second voltage detection unit (110). The first voltage detection unit (96) is a circuit, which monitors the battery voltage continuously. When battery (116) is connected, then the first voltage detection unit (96) monitors the output voltage (76) continuously. In case of battery-less condition the second voltage detection unit (110) monitors the output voltage (76) continuously. The first voltage detection unit (96) is configured to detect the output voltage (76) at the output terminal of the device and compares the output voltage (76) with respect to the first predefined voltage (72) in battery connected condition and outputs a fourth signal (94). This may be high or a low signal. If the output voltage (76) is greater than the first predefined voltage (72), then the fourth signal (94) becomes high. Whereas, if the output voltage (76) is lower than the first predefined voltage, the fourth signal (94) becomes low.

Similarly in battery-less condition, the second voltage detection unit (110) detects the output voltage (76) at the output terminal of the device and compares the output voltage (76) with respect to the third predefined voltage (78) and outputs fourth signal (94), which may be high or a low. If the output voltage (76) is greater than the third predefined voltage (78), then the fourth signal (94) outputs high. Whereas if the output voltage (76) is lower than the third predefined voltage (78), then the fourth signal (94) outputs low.

The output either from first voltage detection unit (96) or second voltage detection unit (110) and phase detection unit (90) goes to shunting mode control unit (98). The shunting mode control unit (98) is configured to provide a first signal (100). The first signal (100) is high only when both the inputs are high i.e. when the first voltage detection unit (96) in battery connected condition or second voltage detection unit (110) in battery-less condition and phase detection unit (90) outputs are high signals, then the output of shunting mode control unit (98) outputs high signal which is first signal (100). In case even-if the fourth signal (94) goes low the first signal (100) remains high till the third signal (92) remains high. The shunting mode control unit (98) controls the shunting of each MOSFET in the second rectifying unit (18) independently.

The controlling unit (80) also includes a rectification mode control unit (102). The rectification mode control unit (102) controls the rectification during rectification mode for each phase during the negative cycle for each MOSFET in second rectifying unit (18). The rectification mode control unit (102) is configured to receive the third signal and to provide a second signal (104), which is inversion of the output of the phase detection unit (90) i.e. the third signal (92).

This first signal (100) and the second signal (104) are OR-ed and the resultant output is input at a gate drive unit (106). The gate drive unit (106) outputs the gate control signal with respect to each MOSFET in second rectifying unit (18). The gate drive unit (106) is configured to release gate control signals i.e. gate control signal for MOSFET 4 (60), gate control signal for MOSFET 5 (62) and gate control signal for MOSFET 6 (64) for the second gate terminals of MOSFET 4 (50), MOSFET 5 (52) and MOSFET 6 (54) based on second signal and first signal, and thereby controlling the gate terminals of these MOSFETs to allow them switching between shunt mode and rectification mode.

The second rectifying unit (18) i.e. MOSFET 4 (50), MOSFET 5 (52) and MOSFET 6 (54) continues in shunt mode once the gate control signal activates or triggers its respective second gate terminal and there after the second rectifying unit (18) becomes independent of the output voltage, i.e. once the MOSFETs are switched then even if the output voltage (76) becomes equal to or lower than the first predefined voltage (72) the second rectifying unit continues in the shunt mode as long as the first signal (100) i.e. the output of the respective shunting mode control unit (90) is positive in the corresponding positive cycle.

In the second rectifying unit (18), rectification takes place through the internal diodes of second rectifying units (18) i.e. MOSFET 4 (50), MOSFET 5 (52) and MOSFET 6 (54) when negative cycles of each phase conducts naturally. This rectification becomes more efficient when the second rectifying units (18) switches ON i.e. MOSFET 4 (50), MOSFET 5 (52) and MOSFET 6 (54) to bypass its internal diodes, resulting in low voltage drop in second rectifying unit (18) than in its internal diodes'. Thereby resulting in regulator rectifier device (10) becomes thermally more efficient in active rectification mode.

In Rectification mode, when the negative cycle is detected by phase detection unit (90) with respect to second predefined voltage (74) i.e. lower than second predefined voltage (74), the third signal (92) becomes low, then the shunting mode control unit (98) outputs a low signal thereby making the first signal (100) low. Simultaneously, the rectification mode control unit (102) outputs a high signal i.e. the second signal (104) becomes high. These outputs are OR-ed and input to the gate drive unit (106), which accordingly outputs gate control signals for each MOSFET in the second rectifying unit (18).

Figure 3A:
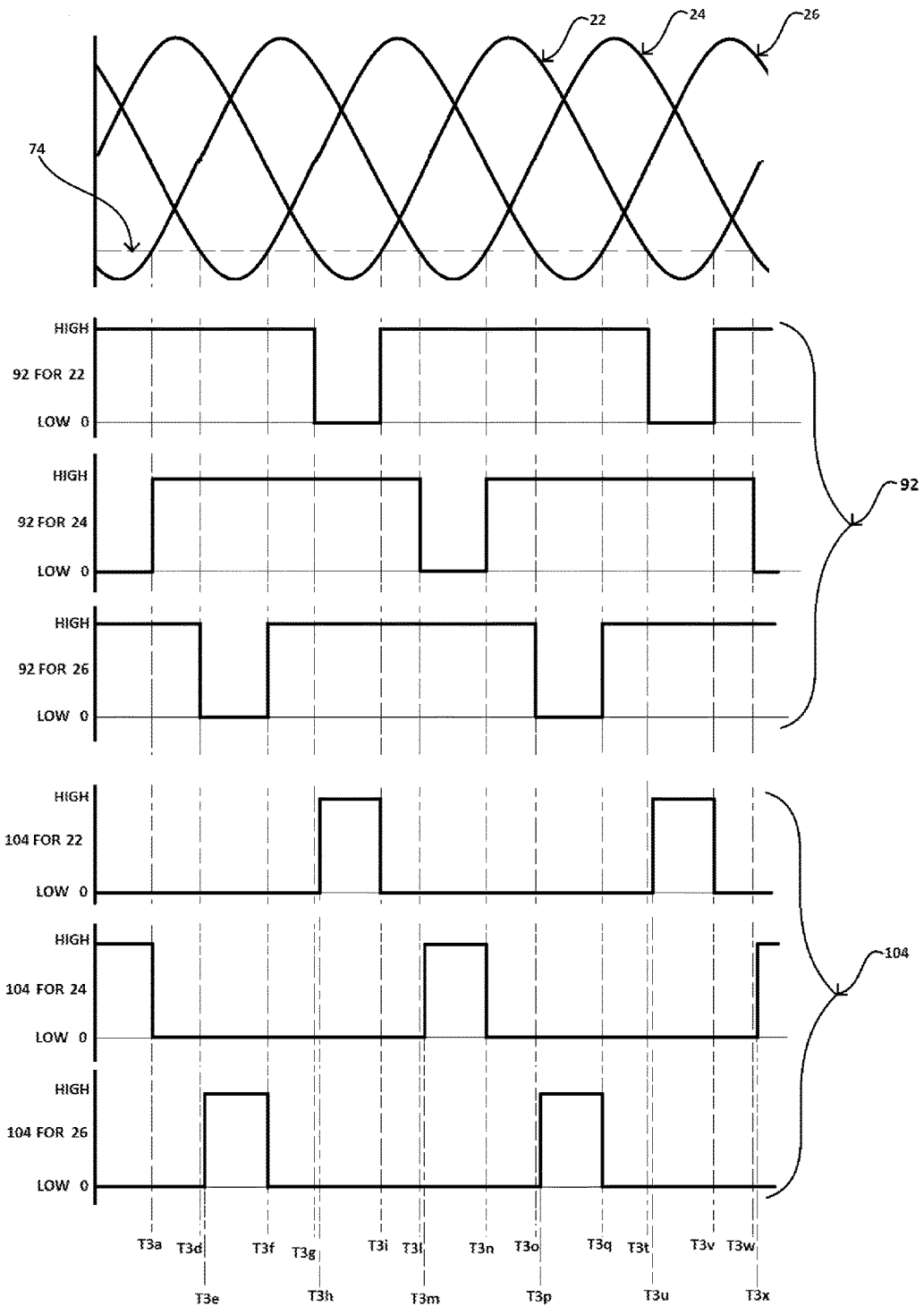
FIGS. 3a & 3b illustrates an embodiment of the present invention depicting a voltage waveform diagram illustrating shunting and rectification mode in battery connected condition.

The FIG. 3a shows the output voltage waveform of the phase detection unit (90) i.e. third signal (92) and rectification mode control unit (102) i.e. second signal (104) for each phase of the three phase alternating current voltage i.e. R phase (22), Y phase (24) and B phase (26) in battery (116) connected condition. The output of the phase detection unit (90) for R phase (22) remains high in the time period of −0 to T3g, T3i to T3t and after T3v. Similarly for Y phase (24) the output of the phase detection unit (90) remains high for −T3a to T3l, T3n to T3w. Whereas for B phase (26) the output of the phase detection unit (90) remains high for the time period of −0 to T3d, T3f to T3o and after T3q. The output of the phase detection unit (90) is Low for R phase (22) from time period −T3g to T3i and T3t to T3v, whereas for Y phase (24) −0 to T3a, T3l to T3n and after T3w and similarly for B phase (26) −T3d to T3f and T3o to T3q. The rectification mode control unit (102) as discussed above outputs inverted signal of third signal (92) with some fixed delay which is second signal (104) i.e. output of rectification control unit (102). The output of rectification mode control unit (102) will be high i.e. the second signal (104) will be high for the R phase (22) from time period of T3h to T3i, T3u to T3v, similarly for Y phase from time period of −0 to T3a, T3m to T3n, and after T3x, and similarly for B phase (26) from time period of −T3e to T3f, T3p to T3q.

Figure 3B:
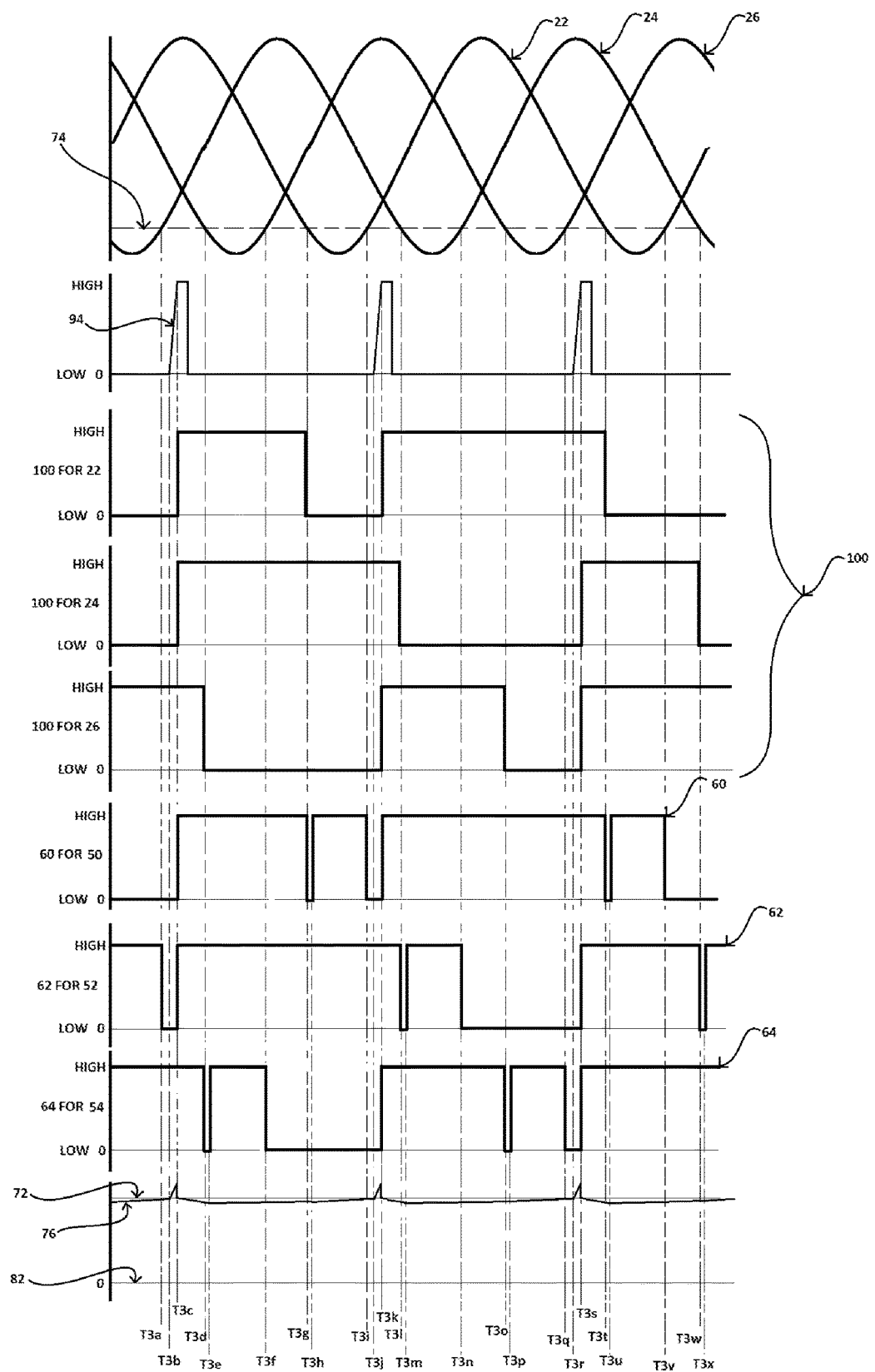

The FIG. 3b shows the output voltage waveform of the first voltage detection unit (96), shunting mode control unit (98) and the gate drive unit (106) for each phase of the three phase alternating current voltage i.e. R phase (22), Y phase (24) and B phase (26) in battery connected condition. The FIG. 3b is a continuation of the FIG. 3a. During the time period from T3b to T3c, T3j to T3k, and T3r to T3s, the output voltage (76) is higher than the first predefined voltage (72). During this time period the output of first voltage detection unit (96) i.e. fourth signal (94) goes to high from the low. This output acts as one of the input to the shunting mode control unit (98). And simultaneously if phase detection unit (90) inputs high to the shunting mode control unit (98) for each phase, then the output of the shunting mode control unit (98) i.e. the first signal (100) becomes high, for R phase (22) from time period of −T3c to T3g and T3k to T3t, similarly for Y phase from time period of (24) T3c to T3l and T3s to T3w, and for B Phase (26) from time period of −0 to T3d, T3k to T3o and T3s afterward. In case even-if the fourth signal (94) goes low, the first signal (100) remains high till the third signal (92) remains high. The output of both shunting mode control unit (98) and rectification mode control unit (102) i.e. the first signal (100) and second signal (104) respectively are OR-ed and given to the gate drive unit (106), which thereby results in switching ON the second rectifying unit (18). The OR-ed output from first signal (100) and second signal (104) input to the gate drive unit (106) so the gate control signals of each phase will be high for R phase (22) from time period of T3c to T3g, T3h to T3i, T3k to T3t and T3u to T3v, similarly for Y phase (24) from time period of −0 to T3a, T3c to T3l, T3m to T3n, T3s to T3w and after T3x, and for B phase (26) from time period of −0 to T3d, T3e to T3f, T3k to T3o, T3p to T3q and after T3s.

The regulator rectifier device (10) is also provided with a RPM dependent power supply (70). The power supply (70) supplies power to the controlling unit (80) in accordance with the output of the generating device (20) i.e. three phase alternating current voltage. Power Supply is common and known to the person skilled in the art and therefore detailed description of their operation is omitted.

The second rectification unit (18) is connected to a peak voltage limiting unit (108) which is configured to minimize the peak voltage during crossing of the positive cycle to negative cycle or crossing of the negative cycle to positive cycle i.e. during the crossing of second predefined voltage (74) in each phase of the three phase alternating current voltage. The peak voltage limiting unit (108) is connected between each drain of the MOSFETs in the second rectifying unit i.e. MOSFET 4 (50), MOSFET 5 (52) and MOSFET 6 (54) and their respective second gate terminals of MOSFETs. This peak voltage limiting unit (108) controls or reduces the spike voltages which are generated while switching of MOSFETs in the second rectifying unit (18).

Further there is a fixed micro delay between the changing state from positive pulse to negative pulse of respective phase at phase detection unit (90) and the changing state from low to high of output of respective phase at rectification mode control unit (102). This fixed micro delay is used to separate the shunting mode and rectification mode. The fixed micro delay as shown in FIG. 3a for R phase (22) is from time period of −T3g to T3h, T3t to T3u, similarly for Y phase (24) is from time period of −T3l to T3m, T3w to T3x, and for B phase (26) is from time period of −T3d to T3e and T3o to T3p.

During crossing of positive cycle to negative cycle or crossing of negative cycle to positive cycle i.e. during the crossing of second predefined voltage (74), when the controlling unit (80) is neither switching the second rectifying unit (18) in rectification mode nor in shunt mode, there is a possibility of peak voltages. These peak voltages are of very small duration and energy, however it skips the control of the controlling unit (80). Therefore in order to minimize these peak voltages into a safer limit the peak voltage limiting unit (108) is connected between the drain terminal and the gate terminal of the second rectifying units (18) i.e. MOSFET 4 (50), MOSFET 5 (52) and MOSFET 6 (54) as shown in FIG. 1. The peak voltage limiting unit (108) comprising of TVS diodes, which clips the peak voltage level of respective phases and thereby controls the voltage into a safer limit.

In rectification mode i.e. when shunting of the second rectifying unit (18) completes or when the negative cycle is detected by the phase detection unit (90) which is below the second predefined voltage (74), the controlling unit (80)

outputs the gate control signal to second gate terminals of the second rectifying unit (18) and thereby switching ON the second rectifying unit (18) corresponding to the same phase. This enables the utilization of low drop or efficiency through providing least resistive passage through MOSFETs by bypassing its internal diodes in the second rectifying unit (18) thereby resulting in the active rectification.

Figure 4:
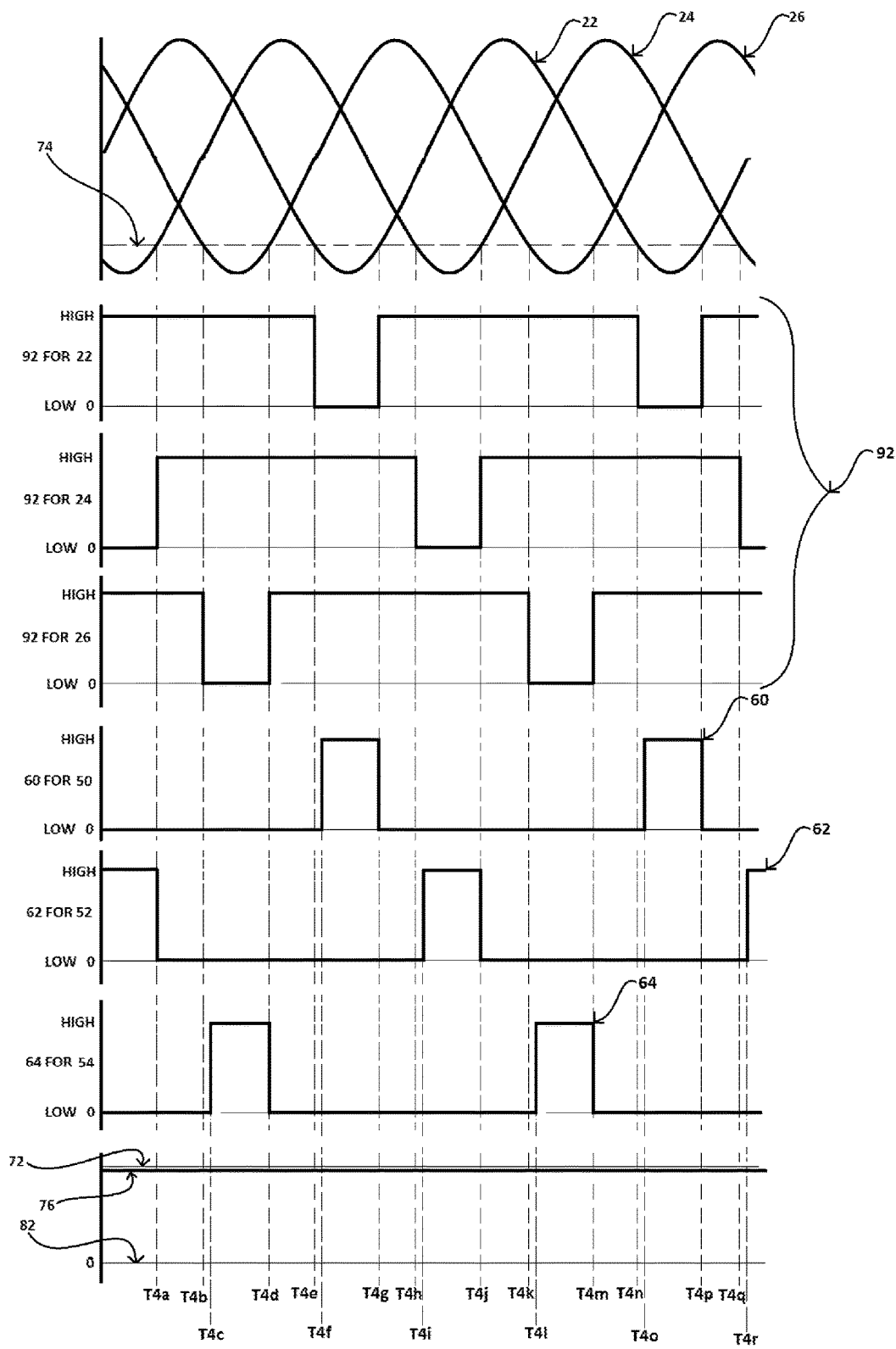
FIG. 4 illustrates an embodiment of the present invention depicting a voltage waveform diagram illustrating full rectification mode in battery connected condition.

In an alternate embodiment, FIG. 4 shows output voltage waveform of the phase detection unit (90) and the gate drive unit (106) for each phase of the three phase alternating current voltage i.e. R phase (22), Y phase (24) and B phase (26) in battery connected condition and during full load condition i.e. when the output voltage (76) is lower than the first predefined voltage (72). In this Full rectification mode, in first rectifying unit (16), positive cycle rectification takes place through the internal diodes of first rectifying unit (16) i.e. MOSFET 1 (30), MOSFET 2 (32) and MOSFET 3 (34). The first gate terminals of first rectifying unit (16) are connected to its respective source terminals of same first rectifying unit (16). In the second rectifying unit (18), rectification takes place through the internal diodes of second rectifying units (18) i.e. MOSFET 4 (50), MOSFET 5 (52) and MOSFET 6 (54) when negative cycles of each phase conducts naturally. To make this rectification more efficient the second rectifying units (18) switches ON i.e. MOSFET 4 (50), MOSFET 5 (52) and MOSFET 6 (54) to bypass its internal diodes i.e. second rectifying units (18) are in active rectification, so there is low voltage drop in second rectifying unit (18) than in its internal diodes. Resulting in regulator rectifier device (10) becomes thermally more efficient. The third Signal (92) i.e. the output of the phase detection unit (90) becomes high i.e. positive pulse for R phase (22) from time period of –0 to T4e, T4g to T4n and after T4p, for Y phase (24) from time period of –T4a to T4h, T4j to T4q, and for B phase (26) from time period of –0 to T4b, T4d to T4k, and after T4m. The Third Signal (92) i.e. the output of the phase detection unit (90) will be low i.e. negative pulse for R phase (22) from time period of –T4e to T4g and T4n to T4p, for Y phase (24) from time period of –0 to T4a, T4h to T4j and T4q afterwards, and for B phase (26) from time period of –T4b to T4d and T4k to T4m. Since the output voltage (76) in full load condition is lower than the first predefined voltage (72), the output of the shunting mode control unit (98) remains low i.e. the first signal (100) always remains low.

Simultaneously, the rectification mode control unit (102) outputs second signal (104) which is inverted signal of third signal (92) with some fixed delay which is same as gate control signals for each phase i.e. gate control signal for MOSFET 4 (60), gate control signal for MOSFET 5 (62), gate control signal for MOSFET 6 (64). Therefore, the output of the gate drive unit (106) i.e. gate control signals for each phase becomes high, for R phase (22) from time period of T4f to T4g and T4o to T4p, for Y phase (24) from the time period of –0 to T4a, T4i to T4j and T4r afterward, and for B phase (26) from the time period of –T4c to T4d and T4l to T4m. There is a fixed micro delay between changing from positive pulse to negative pulse of the output of phase detection unit (90) and low to high of the output of rectification mode control unit (102). Gate drive unit (106) outputs gate control signal which is same as second signal (104) for each phase. This fixed micro delay for R phase (22) is from time period of –T4e to T4f and T4n to T4o, for Y phase (24) is from time period of –T4h to T4i and T4q to T4r, and for B phase (26) is from time period of –T4b to T4c and T4k to T4l. The output of gate drive unit (106) will be high for R phase (22) from time period of –T4f to T4g and T4o to T4p, for Y phase (24) is from time period of –0 to T4a, T4i to T4j and T4r afterward, and for B phase (26) from time period of –T4c to T4d and T4l to T4m. Thus, whenever the output of the gate drive unit (106) is high, the MOSFETs in the second rectifying unit (18) will remain in ON condition.

In the battery less condition the output terminal of the regulator rectifier device (10) is connected with the second voltage detection unit (110) as discussed above which senses the battery less condition and a capacitor (114) to support the regulated output voltage (76).

Figure 5A:
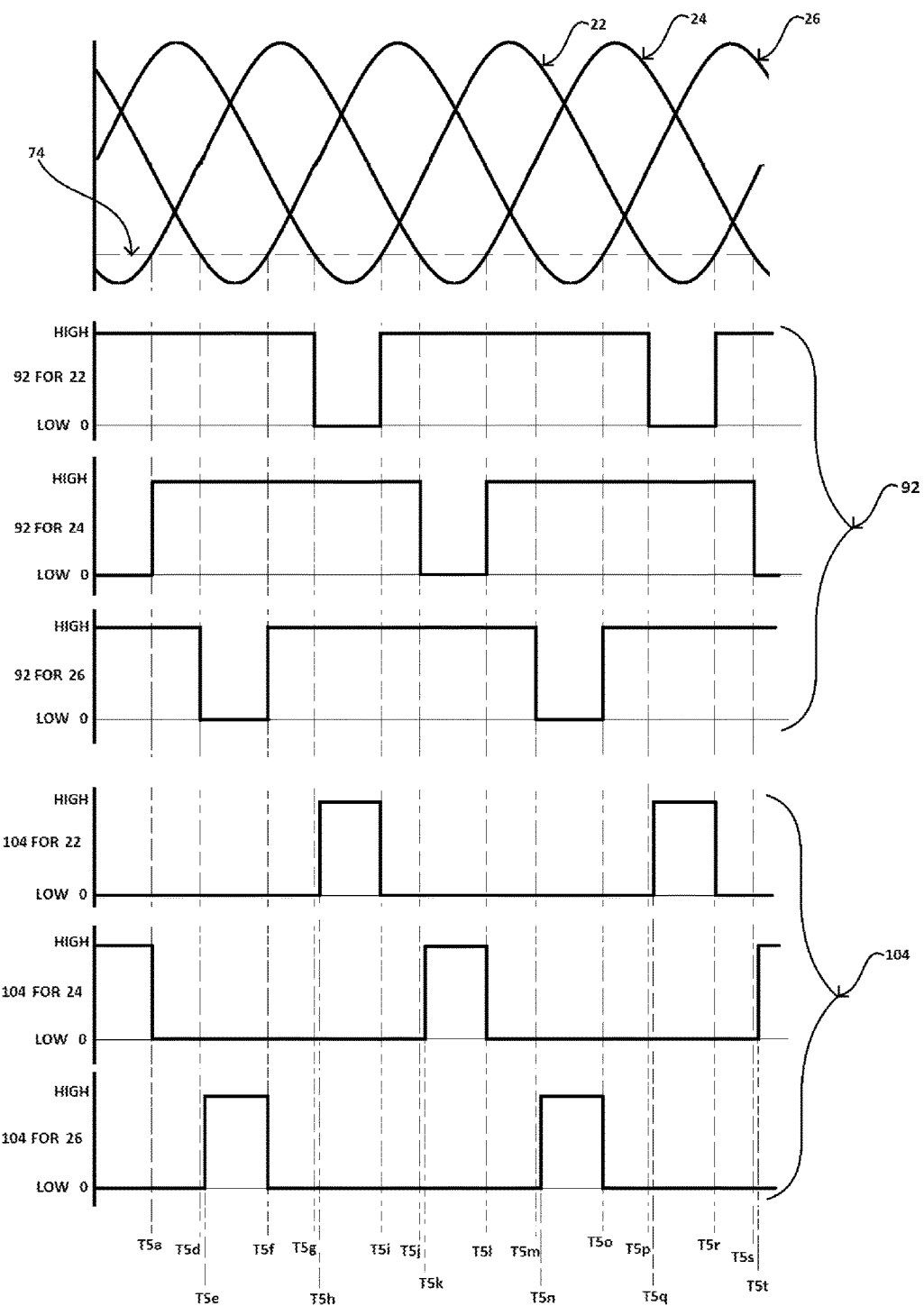
FIGS. 5a & 5b illustrates an embodiment of the present invention depicting a voltage waveform diagram illustrating shunting and rectification mode in battery-less condition.

The FIG. 5a shows the output voltage waveform of the phase detection unit (90) i.e. third signal (92) and rectification mode control unit (102) i.e. second signal (104) for each phase of the three phase alternating current voltage i.e. R phase (22), Y phase (24) and B phase (26) in battery-less condition. The output of the phase detection unit (90) for R phase (22) remains high in the time period of –0 to T5g, T5i to T5p and after TSr. Similarly for Y phase (24) the output of the phase detection unit (90) remains high for –T5a to T5j, T5l to T5s. Whereas for B phase (26) the output of the phase detection unit (90) remains high for the time period of –0 to T5d, T5f to T5m and after T5o. The output of the phase detection unit (90) is low for R phase (22) from time period –T5g to T5i and T5p to TSr, whereas for Y phase (24) –0 to T5a, T5j to T5l and after T5s and similarly for B phase (26) –T5d to T5f and T5m to T5o. The rectification mode control unit (102) as discussed above outputs inverted signal of third signal (92) with some fixed delay which is second signal (104) i.e. output of rectification control unit (102). The output of rectification mode control unit (102) is high i.e. the second signal (104) is high for the R phase (22) from time period of T5h to T5i, T5q to T5r, similarly for Y phase from time period of –0 to T5a, T5k to T5l, and after T5t, and similarly for B phase (26) from time period of –T5e to T5f, T5n to T5o.

Figure 5B:
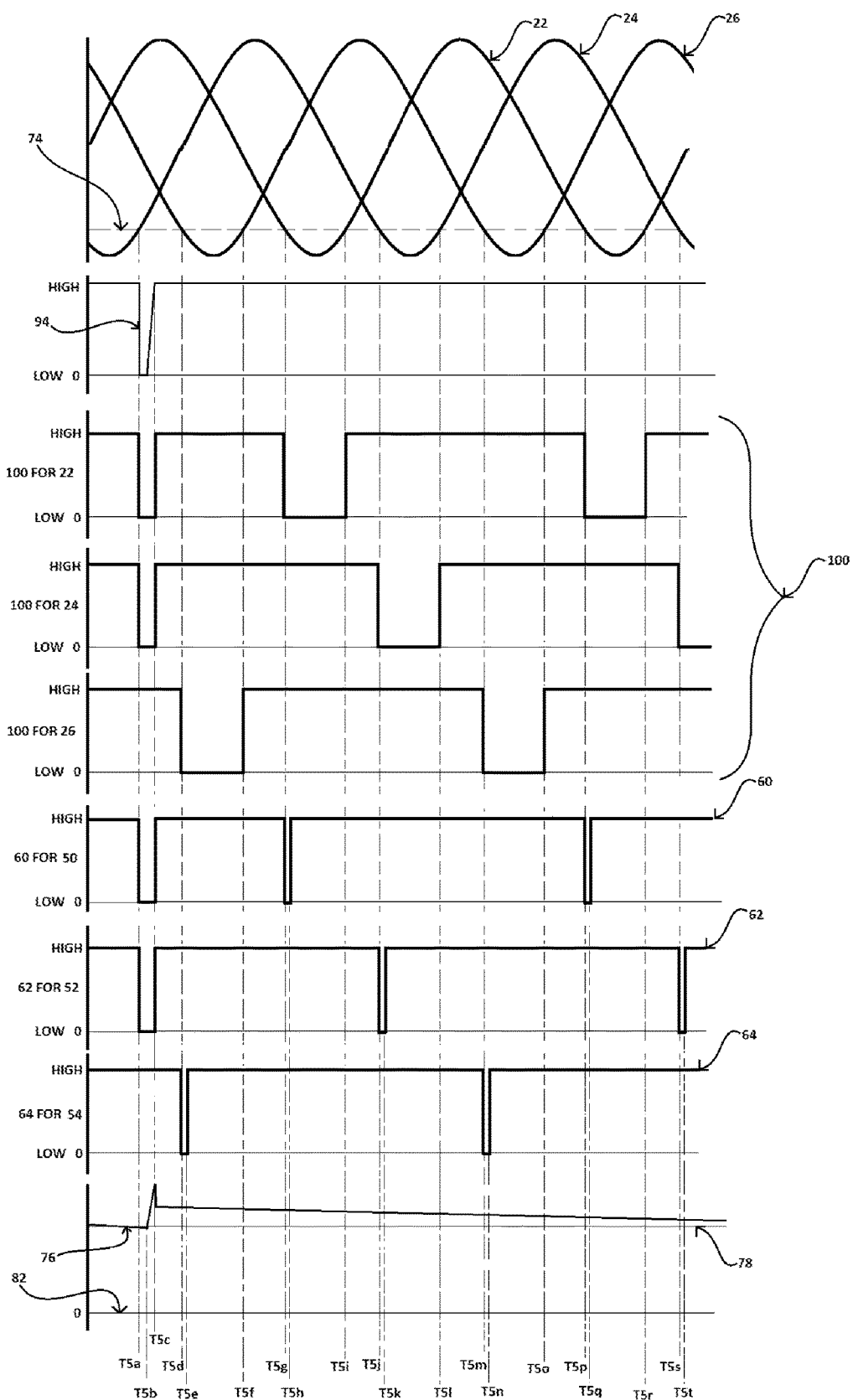

The FIG. 5b shows the output voltage waveform of the second voltage detection unit (110), shunting mode control unit (98) and the gate drive unit (106) for each phase of the three phase alternating current voltage i.e. R phase (22), Y phase (24) and B phase (26) in battery-less condition. The FIG. 5b is a continuation of the FIG. 5a. In battery-less condition, the regulation of output voltage (76) at the output terminal of the regulator rectifier device (10) depends on charging and discharging of output capacitor (114) which is connected at the output terminal of regulator rectifier device (10). During the time period from 0 to T5a, after T5b, the output voltage (76) is higher than the third predefined voltage (76). During this time period the output of second voltage detection unit (110) i.e. fourth signal (94) is high. This output acts as one of the input to the shunting mode control unit (98). And simultaneously if phase detection unit (90) inputs high to the shunting mode control unit (98) for each phase, then the output of the shunting mode control unit (98) i.e. the first signal (100) becomes high, for R phase (22) from time period of –0 to T5a, T5c to T5g, T5i to T5p, and after T5r, similarly for Y phase from time period of (24) –0 to T5a, T5c to T5j and T5l to T5s, and for B Phase (26) from time period of –0 to T5d, T5f to T5m and T5o afterward.

In case even-if the fourth signal (94) goes low the first signal (100) remains high till the third signal (92) remains high. The output of both shunting mode control unit (98) and rectification mode control unit (102) i.e. the first signal (100) and second signal (104) respectively are OR-ed and given to the gate drive unit (106), which thereby results switching ON the second rectifying unit (18) to enable switching of the second rectifying unit into shunt mode. The OR-ed output from first signal (100) and second signal (104) inputted to the gate drive units (106) so the gate control signals of each phase remains high for R phase (22) from time period of −0 to T5a, T5c to T5g, T5h to T5p, and after T5q, similarly for Y phase (24) from time period of −0 to T5a, T5c to T5j and T5k to T5s, and after T5t, and for B phase (26) from time period of −0 to T5d, T5e to T5m and T5n afterward.

Figure 6:
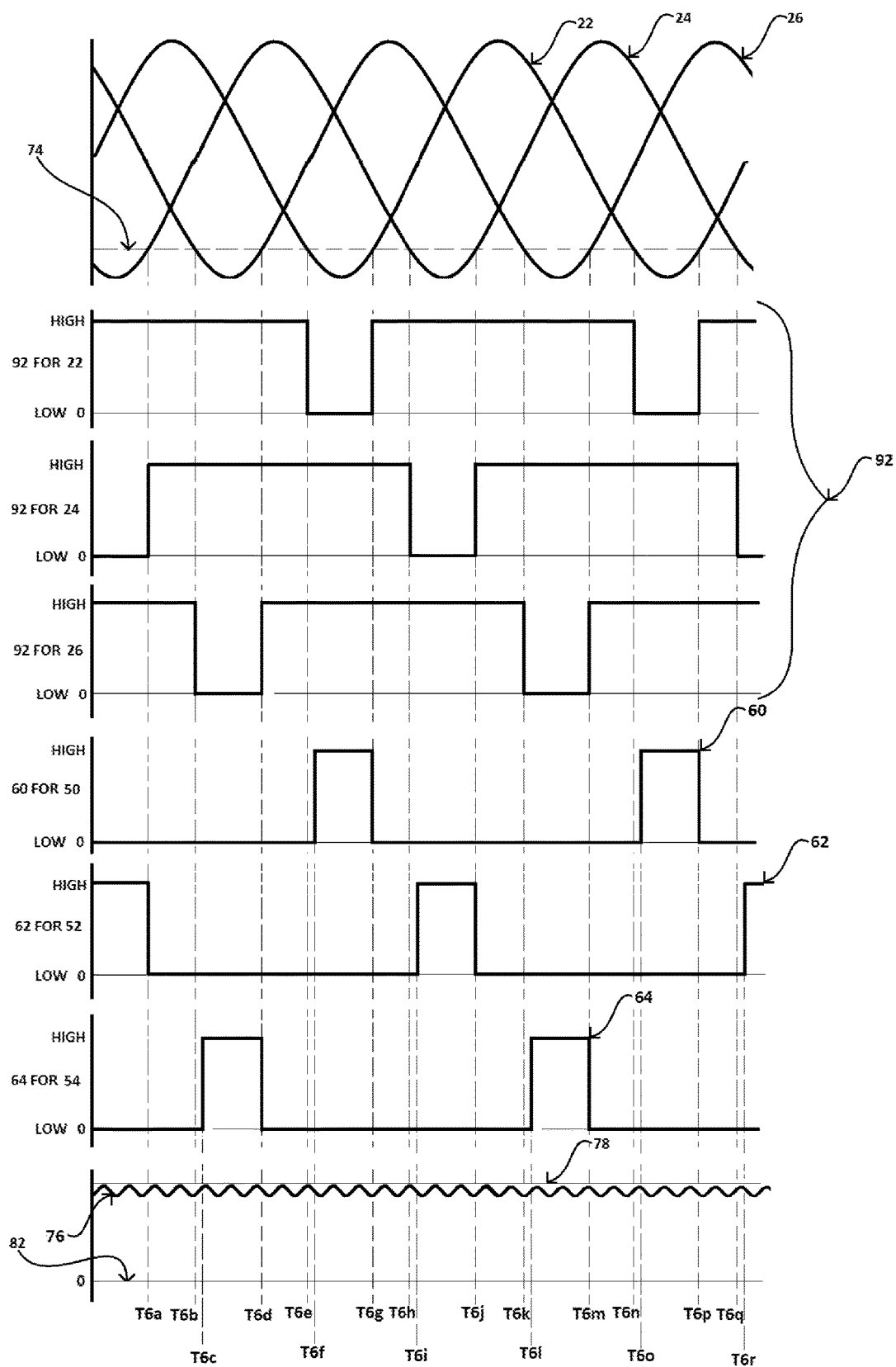
FIG. 6 illustrates an embodiment of the present invention depicting a voltage waveform diagram illustrating full rectification mode in battery-less condition.

In an alternate embodiment, FIG. 6 shows output voltage waveform of the phase detection unit (90) and the gate drive unit (106) for each phase of the three phase alternating current voltage i.e. R phase (22), Y phase (24) and B phase (26) in battery-less condition and during full load condition i.e. when the output voltage (76) is lower than the third predefined voltage (78). In this Full rectification mode, in first rectifying unit (16), positive cycle rectification takes place through the internal diodes of first rectifying unit (16) i.e. MOSFET 1 (30), MOSFET 2 (32) and MOSFET 3 (34). The first gate terminals of first rectifying unit (16) are connected to its respective source terminals of same first rectifying unit (16). In the second rectifying unit (18), rectification takes place through the internal diodes of second rectifying unit (18) i.e. MOSFET 4 (50), MOSFET 5 (52) and MOSFET 6 (54) when negative cycles of each phase conducts naturally. To make this rectification more efficient second rectifying unit (18) switches ON i.e. MOSFET 4 (50), MOSFET 5 (52) and MOSFET 6 (54) to bypass its internal diodes i.e. second rectifying unit (18) are in active rectification, so there is low voltage drop in second rectifying unit (18) than in its internal diodes. Thereby resulting in regulator rectifier device (10) becomes thermally more efficient. The third signal (92) i.e. the output of the phase detection unit (90) becomes high i.e. positive pulse for R phase (22) from time period of −0 to T6e, T6g to T6n and after T6p, for Y phase (24) from time period of −T6a to T6h, T6j to T6q, and for B phase (26) from time period of −0 to T6b, T6d to T6k, and after T6m. The third signal (92) i.e. the output of the phase detection unit (90) will be low i.e. negative pulse for R phase (22) from time period of −T6e to T6g and T6n to T6p, for Y phase (24) from time period of −0 to T6a, T6h to T6j and T6q afterwards, and for B phase (26) from time period of −T6b to T6d and T6k to T6m. Since the output voltage (76) in full load condition is lower than the third predefined voltage (78), the output of the shunting mode control unit (98) remains low i.e. the first signal (100) always remains low.

Simultaneously, the rectification mode control unit (102) outputs second signal (104) which is inverted signal of third signal (92) with some fixed delay which is same as gate control signals for each phase i.e. gate control signal for MOSFET 4 (60), gate control signal for MOSFET 5 (62), gate control signal for MOSFET 6 (64). Therefore, the output of gate drive unit (106) i.e. gate control signals for each phase becomes high, for R phase (22) from time period of T6f to T6g and T6o to T6p, for Y phase (24) from the time period of −0 to T6a, T6i to T6j and T6r afterward, and for B phase (26) from the time period of −T6c to T6d and T6l to T6m. There is a fixed micro delay between changing from positive pulse to negative pulse of the output of phase detection unit (90) and low to high of the output of rectification mode control unit (102). Gate drive unit (106) outputs gate control signal, which is same as second signal (104) for each phase. This fixed micro delay for R phase (22) is from time period of −T6e to T6f and T6n to T6o, for Y phase (24) is from time period of −T6h to T6i and T6q to T6r, and for B phase (26) is from time period of −T6b to T6c and T6k to T6l. The output of gate drive unit (106) will be high for R phase (22) from time period of −T6f to T6g and T6o to T6p, for Y phase (24) is from time period of −0 to T6a, T6i to T6j and T6r afterward, and for B phase (26) from time period of −T6c to T6d and T6l to T6m. Thus, whenever the output of the gate drive unit (106) is high, the MOSFETs in the second rectifying unit (18) will remain in ON condition.

Figure 7:
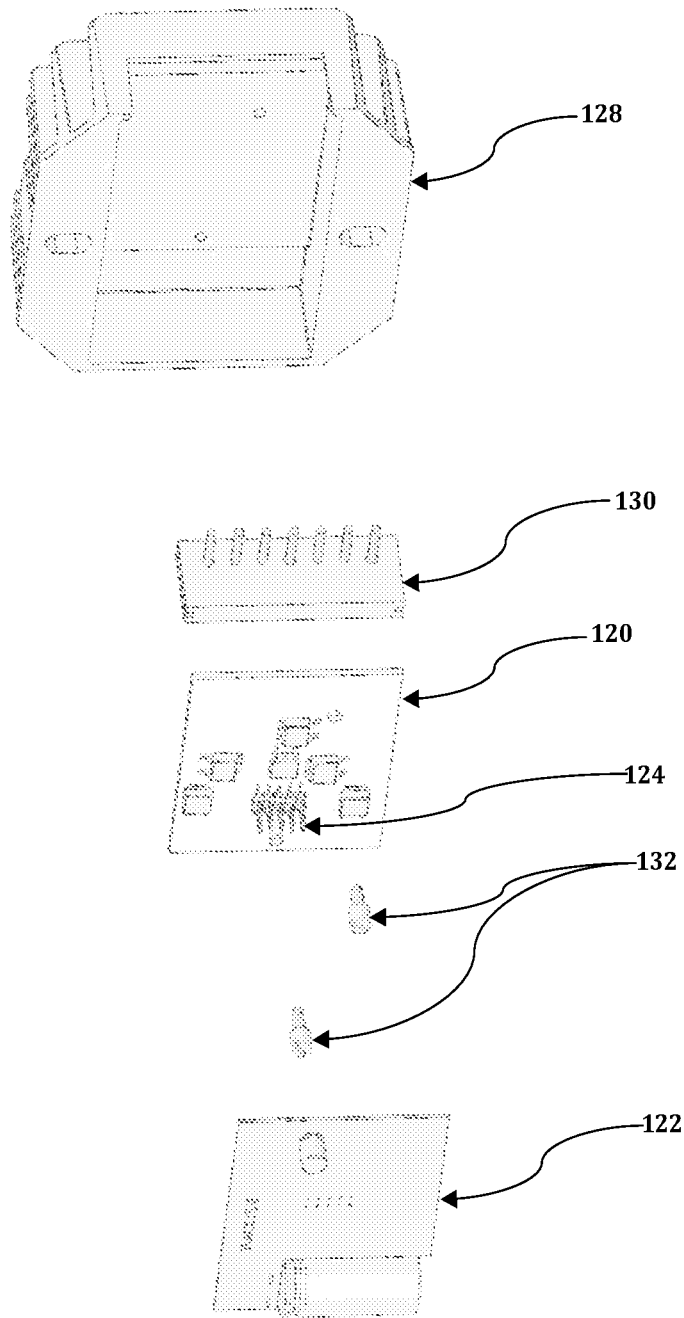
FIG. 7 illustrates an embodiment of the present invention depicting an exploded view of the assembly.

In an alternate embodiment, as shown in FIG. 7, the first rectifying unit i.e. MOSFET 1 (30), MOSFET 2 (32), MOSFET 3 (34) and second rectifying unit i.e. MOSFET 4 (50), MOSFET 5 (52) and MOSFET 6 (54) are assembled on a metal clad aluminum PCB (120), which thereby results in proper dissipation of heat. The use of metal clad aluminum PCB (120) for power devices i.e. first rectifying unit i.e. MOSFET 1 (30), MOSFET 2 (32), MOSFET 3 (34) and second rectifying unit i.e. MOSFET 4 (50), MOSFET 5 (52) and MOSFET 6 (54) reduces the complexity of the regulator assembly (126). Since, both first rectifying devices and second rectifying devices are the MOSFETs and universally known that these devices are very sensitive for ESD failures. Therefore metal clad aluminum PCB (120) makes use of SMD power components possible i.e. first rectifying unit i.e. MOSFET 1 (30), MOSFET 2 (32), MOSFET 3 (34) and second rectifying unit i.e. MOSFET 4 (50), MOSFET 5 (52) and MOSFET 6 (54). This thereby helps to reduce the manual work, so the failure of power devices due to ESD reduces. Whole assembly can be automatic. By using metal clad aluminum PCB (120), heat is more evenly distributed in whole area of aluminum housing (128), thereby resulting in proper heat dissipation of first rectifying unit (16) and second rectifying unit (18). So, there is a less thermal stress on first rectifying unit (16) and second rectifying unit (18). This further results in increasing of life and durability of our regulator rectifier device (10). Further, there is less thermal stress on power tracks on the metal clad aluminum PCB (120) even if very high current passes through it. Even if very high current passes through both i.e. first rectifying unit (16) and second rectifying unit (18), the tab temperature of power devices i.e. first rectifying unit i.e. MOSFET 1 (30), MOSFET 2 (32), MOSFET 3 (34) and second rectifying unit i.e. MOSFET 4 (50), MOSFET 5 (52) and MOSFET 6 (54) does not shoot up. To maintain two separate temperature zones i.e. power component zone and control circuit components zone, all control circuit components are kept on separate Control Card PCB (122) and all power devices on separate metal clad aluminum PCB (120). By doing separate PCB for control circuit and power circuit, it is possible to keep away the control circuit components from power components. Two threaded spacers (132) are used for two purpose firstly it is used to fix the metal clad aluminum PCB (120) and secondly it is used to maintain distance between metal clad aluminum PCB (120) & control card (122). Capacitor (114) which is connected at the output terminal of regulator rectifier device (10) and which is mainly used in battery-less condition, is also assembled in aluminum housing (128). Rubber grommet (130) is used to hold the wiring harness at metal clad aluminum PCB (120) surface level.

Figure 8:
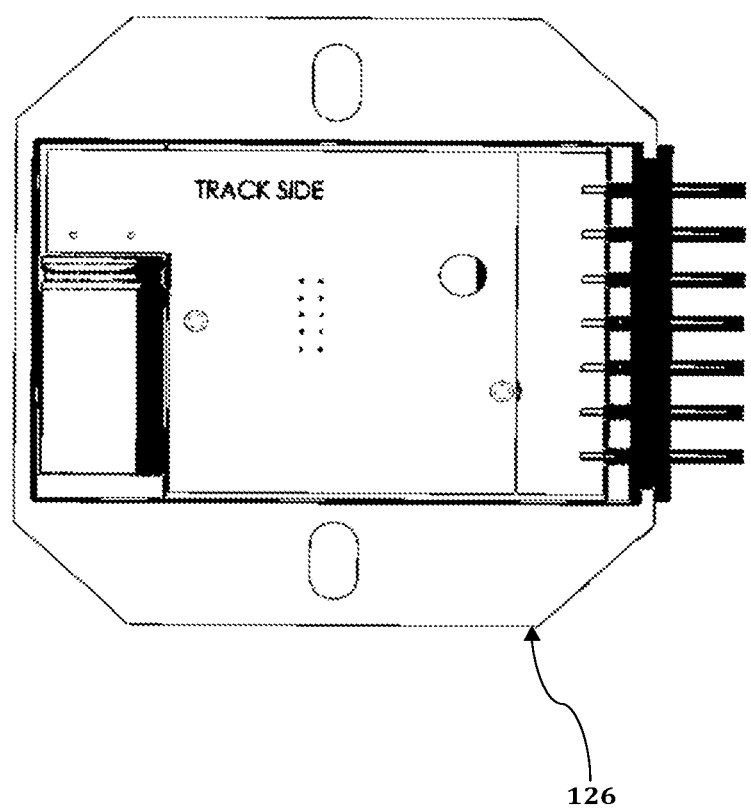
FIG. 8 illustrates an embodiment of the present invention depicting front view of the assembled device.

Further FIG. 8 shows the regulator assemble (126), which includes the regulator rectifier device (10) being assembled on an metal clad aluminum PCB (120) with a control card (122) and a SMD connector (124) in a aluminum housing (128), thereby forming a regulator assembly (126).

The invention claimed is:
1. A regulator rectifier device comprising:
   a source terminal to receive a three phase alternating current voltage with each phase including a positive cycle and a negative cycle from a generating device;

a plurality of first rectifying unit with a first gate terminal, connected to said generating device to rectify the positive cycle of said three phase alternating current voltage;

a plurality of second rectifying unit with a second gate terminal, said second rectifying unit connected to said generating device to rectify the negative cycle of said three phase alternating current voltage, wherein said second rectifying unit switches between rectification mode and shunt mode depending on load condition; and a controlling unit configured to control said second rectifying unit by a gate control signal, said controlling unit outputs said gate control signal based on an output voltage of said regulator rectifier device with respect to any one of a first predefined voltage in battery connected condition and a third predefined voltage in battery-less condition and said positive cycle and said negative cycle of each phase of said three phase alternating current voltage from said generating device, said gate control signal enables said second rectifying unit to switch between rectification mode and shunt mode by controlling the second gate terminal of said second rectifying unit, wherein said gate control signal switches said second rectifying unit into shunt mode when the output voltage of said regulator rectifier device is greater than any one of said first predefined voltage in battery connected condition and said third predefined voltage in battery-less condition, and thereby continuing the shunting of said second rectifying unit as long as said positive cycle of corresponding phase of said three phase alternating current voltage exists.

2. The regulator rectifier device according to claim 1, wherein said controlling unit includes a phase detection unit configured to detect said positive cycle and said negative cycle from each phase of said three phase alternating current voltage with respect to a second predefined voltage, wherein said phase detection unit outputs a third signal with a positive pulse and a negative pulse.

3. The regulator rectifier device according to claim 2, wherein said controlling unit includes a first voltage detection unit configured to detect said output voltage of said regulator rectifier device with respect to said first predefined voltage in battery connected condition.

4. The regulator rectifier device according to claim 3, wherein said controlling unit includes a shunting mode control unit configured to provide a first signal based on the third signal of said phase detection unit and output of said first voltage detection unit with respect to first predefined voltage in battery connected condition.

5. The regulator rectifier device according to claim 3, wherein said controlling unit includes a shunting mode control unit configured to provide a first signal based on the third signal of said phase detection unit and output of a second voltage detection unit configured to detect said output voltage of said regulator rectifier device with respect to said third predefined voltage in battery-less condition.

6. The regulator rectifier device according to claim 5, wherein said controlling unit includes a rectification mode control unit configured to receive said third signal from said phase detection unit to provide a second signal.

7. The regulator rectifier device according to claim 6, wherein said controlling unit includes a gate drive unit configured to release said gate control signal based on said second signal from said rectification mode control unit and said first signal from said shunting mode control unit.

8. The regulator rectifier device according to claim 6, wherein said gate control signal enables the second rectifying unit to switches in rectification mode when the phase detection unit detects said negative cycle of corresponding phase of said three phase alternating current voltage lower than said second predefined voltage.

9. The regulator rectifier device according to claim 8, wherein said second rectifying unit is connected to a peak voltage limiting unit configured to minimize the peak voltage during crossing of said second predefined voltage in each phase of said three phase alternating current voltage.

10. The regulator rectifier device according to claim 6, wherein existence of a micro delay between changing of said third signal from positive pulse to negative pulse at the output of said phase detection unit with respect to each phase of said three phase alternating current voltage and changing of said second signal from low to high at the output of said rectification mode control unit separates shunt mode and rectification mode of said second rectifying unit.

11. The regulator rectifier device according to claim 5, wherein during battery less condition, the output terminal of said regulator rectifier device is connected with said second voltage detection unit to sense battery less condition and a capacitor to support regulated said output voltage with respect to said third predefined voltage.

12. The regulator rectifier device according to claim 1, wherein said second rectifying unit continues in shunt mode by said gate control signal and thereby said second rectifying unit becomes independent of said output voltage of said regulator rectifier device with respect to said first predefined voltage as long as the positive cycle of corresponding phase of said three phase alternating current voltage exists.

13. The regulator rectifier device according to claim 1, wherein said first rectifying unit and said second rectifying unit are assembled on a metal clad aluminum PCB for proper dissipation of heat.

14. The regulator rectifier device according to claim 1, wherein said regulator rectifier device is assembled on a metal clad aluminum PCB with a control card and a SMD connector.

15. The regulator rectifier device according to claim 1, wherein said gate control signal switches said second rectifying unit during rectification mode to provide least resistive passage through said second rectifying unit to bypass internal diodes with its drop of said second rectifying unit and thereby resulting in active rectification.

16. A method for regulating an output voltage of a regulator rectifier device comprising the steps of:
receiving a three phase alternating current voltage with each phase including a positive cycle and a negative cycle from a generating device;
rectifying the positive cycle of said three phase alternating current voltage by a plurality of first rectifying unit with a first gate terminal;
rectifying the negative cycle of said three phase alternating current voltage by a plurality of second rectifying unit with a second gate terminal, said second rectifying unit connected to said generating device, said second rectifying unit switches between rectification mode and shunt mode depending on load condition;
controlling said second rectifying unit by a controlling unit, said controlling unit outputs a gate control signal based on an output voltage of said regulator rectifier device with respect to any one of a first predefined voltage in battery connected condition and a third predefined voltage in battery-less condition and said positive cycle and said negative cycle of each phase of said three phase alternating current voltage from said generating device, said gate control signal enables said second rectifying unit to switch between rectification mode and shunt mode by controlling the second gate terminal of said second rectifying unit, switching said second rectifying unit into shunt mode by said gate control signal when the output voltage of said regulator rectifier device is greater than any one of said first predefined voltage in battery connected condition and said third predefined voltage in battery-less condition, and thereby continuing the shunting of said second rectifying unit as long as said positive cycle of corresponding phase of said three phase alternating current voltage exists.

17. The method according to claim 16, comprising the steps of controlling said second rectifying unit by said controlling unit including detecting said positive cycle and said negative cycle from each phase of said three phase alternating current voltage with respect to a second predefined voltage by a phase detection unit to output a third signal with a positive pulse and a negative pulse.

18. The method according to claim 17, comprising the steps of controlling said second rectifying unit by said controlling unit including detecting said output voltage of said regulator rectifier device with respect to said first predefined voltage by a first voltage detection unit in battery connected condition.

19. The method according to claim 18, comprising the steps of controlling said second rectifying unit by said controlling unit including providing a first signal based on said third signal of said phase detection unit and output of said first voltage detection unit with respect to first predefined voltage by a shunting mode control unit in battery connected condition.

20. The method according to claim 18, comprising the steps of controlling said second rectifying unit by said controlling unit including providing a first signal based on the third signal of said phase detection unit and output of said second voltage detection unit with respect to third predefined voltage by a shunting mode control unit in battery-less condition.

21. The method according to claim 20, comprising the steps of controlling said second rectifying unit by said controlling unit including providing a second signal based on the third signal from said phase detection unit by a rectification mode control unit.

22. The method according to claim 21, comprising the steps of controlling said second rectifying unit by said controlling unit including providing said gate control signal based on said second signal from said rectification mode control unit and said first signal from said shunting mode control unit by a gate drive unit.

23. The method according to claim 21, comprising the steps of controlling said second rectifying unit by said controlling unit including switching said second rectifying unit by said gate control signal into rectification mode when the phase detection unit detects said negative pulse of corresponding phase of said three phase alternating current voltage lower than said second predefined voltage.

24. The method according to claim 23, comprising the steps of controlling said second rectifying unit by said controlling unit including minimizing peak voltages during crossing of said second predefined voltage in each phase of said three phase alternating current voltage by a peak voltage limiting unit connected to said second rectifying unit.

25. The method according to claim 21, comprising the steps of rectifying each phase of said three phase alternating current voltage by said second rectifying unit in shunt mode and rectification mode separated from each other by a micro delay existing between changing of said positive pulse to said negative pulse in the third signal at the output of said phase detection unit with respect to each phase of said three phase alternating current voltage and changing of said second signal from low to high at the output of said rectification mode control unit.

26. The method according to claim 16, comprising the steps of controlling said second rectifying unit by said controlling unit including continuing of said second rectifying unit in shunt mode independent of said output voltage of said regulator rectifier device with respect to said first predefined voltage as long as the positive cycle of corresponding phase of said three phase alternating current voltage exists.

27. The method according to claim 16, comprising the steps of controlling said second rectifying unit by said controlling unit including regulating said output voltage during battery less condition by connecting the output terminal of said regulator rectifier device with a second voltage detection unit to sense battery less condition and a capacitor to support regulated said output voltage with respect to the third predefined voltage.

28. The method according to claim 16, comprising the steps of assembling said first rectifying unit and said second rectifying unit on a metal clad aluminum PCB for proper dissipation of heat.

29. The method according to claim 16, comprising the steps of assembling said regulator rectifier device on a metal clad aluminum PCB with a control card and a SMD connector.

* * * * *